US 6,501,415 B1

(12) United States Patent
Viana et al.

(10) Patent No.: US 6,501,415 B1
(45) Date of Patent: Dec. 31, 2002

(54) HIGHLY INTEGRATED SINGLE SUBSTRATE MMW MULTI-BEAM SENSOR

(75) Inventors: Luis M. Viana, Wakefield, MA (US); Michael Joseph Delcheccolo, Westford, MA (US); Joseph S. Pleva, Londonderry, NH (US); Mark E. Russell, Westford, MA (US); Walter Gordon Woodington, Lincoln, MA (US); H. Barteld Van Rees, Needham, MA (US); Stephen P. LeBlanc, Stratham, NH (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/931,277

(22) Filed: Aug. 16, 2001

Related U.S. Application Data

(60) Provisional application No. 60/226,160, filed on Aug. 16, 2000.

(51) Int. Cl.[7] .......................... G01S 13/04; G01S 13/93
(52) U.S. Cl. ........................ 342/27; 342/70; 342/175; 342/195
(58) Field of Search .......................... 342/27, 28, 70, 342/71, 72, 73, 74, 81, 104, 117, 118, 128, 133, 134, 139, 146, 147, 158, 175, 368, 371, 372, 373, 192–197

(56) References Cited

U.S. PATENT DOCUMENTS 4,063,243 A 12/1977 Anderson et al.
4,209,791 A 6/1980 Gerst et al.

(List continued on next page.)

FOREIGN PATENT DOCUMENTS

| DE | 198 55 400 A1 | 12/1998 |
| EP | 0 398 712 A2 | 5/1990 |
| EP | 0 484 995 A2 | 5/1992 |
| EP | 0 642 190 A1 | 12/1993 |
| EP | 0 784 213 A2 | 1/1996 |
| EP | 0 978 729 A2 | 2/2000 |
| EP | 0 982 173 A2 | 3/2000 |
| EP | 1 020 989 A2 | 7/2000 |
| FR | 2 709 834 A1 | 9/1993 |

OTHER PUBLICATIONS

Barnett, Roy I. et al. "A Feasibility Study of Stripline–Fed Slots Arranged as a Planar Array with Circular Grid and Circular Boundary", IEEE, 1989, pp. 1510–1515.
Bhattacharyya, Arum, et al. "Analysis of Srripline–Fed Slot–Coupled Patch Antennas with Vias for Parallel–Plate Mode Suppression", IEEE Transactions on Antennas and Propagation, vol. 46, No. 4, Apr. 1998, pp. 538–545.

(List continued on next page.)

Primary Examiner—Bernarr E. Gregory
(74) Attorney, Agent, or Firm—Daly, Crowley & Mofford, LLP

(57) ABSTRACT

A multiple beam array antenna system comprises a plurality of radiating elements provided from stripline-fed open-ended waveguide coupled to a Butler matrix beam forming network. The Butler matrix beam forming network is coupled to a switched beam combining circuit. The antenna can be fabricated as a single Low Temperature Co-fired Ceramic (LTCC) circuit.

22 Claims, 9 Drawing Sheets

U.S. PATENT DOCUMENTS

| | | | |
|---|---|---|---|
| 4,246,585 | A | 1/1981 | Mailloux |
| 4,414,550 | A | 11/1983 | Tresselt |
| 4,507,662 | A | 3/1985 | Rothenberg et al. |
| 4,962,383 | A | 10/1990 | Tresselt |
| 5,008,678 | A | 4/1991 | Herman |
| 5,249,157 | A | 9/1993 | Taylor |
| 5,325,096 | A | 6/1994 | Pakett |
| RE34,773 | E | 11/1994 | Dombrowski |
| 5,394,292 | A | 2/1995 | Hayashida |
| 5,396,252 | A | 3/1995 | Kelly |
| 5,410,745 | A | 4/1995 | Friesen et al. |
| 5,451,960 | A | 9/1995 | Kastella et al. |
| 5,479,173 | A | 12/1995 | Yoshioka et al. |
| 5,508,706 | A | 4/1996 | Tsou et al. |
| 5,517,196 | A | 5/1996 | Pakett et al. |
| 5,517,197 | A | 5/1996 | Algeo et al. |
| 5,530,447 | A | 6/1996 | Henderson et al. |
| 5,613,039 | A | 3/1997 | Wang et al. |
| 5,619,208 | A | 4/1997 | Tamatsu et al. |
| 5,625,362 | A | 4/1997 | Richardson |
| 5,627,510 | A | 5/1997 | Yuan |
| 5,633,642 | A | 5/1997 | Hoss et al. |
| 5,675,345 | A | 10/1997 | Pozgay et al. |
| 5,689,264 | A | 11/1997 | Ishikawa et al. |
| 5,926,126 | A | 7/1999 | Engleman |
| 5,929,802 | A | 7/1999 | Russell et al. |
| 5,959,570 | A | 9/1999 | Russell |
| 5,999,092 | A | 12/1999 | Smith et al. |
| 5,999,119 | A | 12/1999 | Carnes et al. |
| 5,999,874 | A | 12/1999 | Winner et al. |
| 6,011,507 | A | 1/2000 | Curran et al. |
| 6,026,347 | A | 2/2000 | Schuster |
| 6,037,860 | A | 3/2000 | Zander et al. |
| 6,069,581 | A | 5/2000 | Bell et al. |
| 6,091,355 | A | 7/2000 | Cadotte, Jr. et al. |
| 6,097,931 | A | 8/2000 | Weiss et al. |
| 6,107,956 | A | 8/2000 | Russell et al. |
| 6,104,336 | A | 9/2000 | Curran et al. |
| 6,114,985 | A | 9/2000 | Russell et al. |
| 6,130,607 | A | 10/2000 | McClanahan et al. |
| 6,198,434 | B1 | 3/2001 | Martek et al. |
| 6,252,560 | B1 | 6/2001 | Tanaka et al. |
| 6,278,400 | B1 * | 8/2001 | Cassen et al. ............... 342/175 |

OTHER PUBLICATIONS

Clouston E.N. et al. "A Triplate Stripline Slot Antenna Developed for Time–Domail Measurements on Phased Arrays", 1998, pp. 312–315.

Das, Nirod K. et al. "Multiport Scattering Analysis of General Multilayered Printed Antennas Fed by Multiple Feed Ports: Part II—Applications", IEEE, 1992, pp. 482–491.

Katehi, Pisti B. et al. "Design of a Low Sidelobe Level Stripline Fed Slot Array Covered by a Dielectric Layer", 1989, pp. 978–981.

Kimura, Yuichi et al. "Alternating Phase Single–Layer Slotted Waveguide Arrays at 25GHz Band", IEEE, 1999, pp. 142–145.

Muir, A., "Analysis of Sripline/Slot Transition", Electronics Letter, vol. 26 No. 15, pp. 1160–1161.

Sakaibara, Kunio et al. "A Single Slotted Waveguide Array for 22GHz Band Radio System Between Mobile Base Station", IEEE, 1994, pp. 356–359.

Sangster, Alan et al. "A Moment Method Analysis of a Transverse Slot Fed by a Boxed Stripline", (No Date) pp. 146–149.

Schaubert, Daniel H. et al. "Moment Method Analysis of a Infinite Stripline–Fed Tapered Slot Antenna Arrays with a Ground Plane", IEEE Transactions on Antennas and Propagation, vol. 42, No. 8, Aug. 1994, pp. 1161.

Smith, Peter "Transverse Slot Radiator in the Ground–Plane of Enclosed Stripline", $10^{th}$ International Conference on Antennas and Propagation 14.17, Apr. 1997, 5 pages.

Theron, Isak Petrus et al. "On Slotted Waveguide Antenna Design at Ka–Band", IEEE Trans. vol. 32, Oct. 1984, pp. 1425–1426.

International Search Report of PCT Application No. PCT/US01/25677 dated Apr. 17, 2002.

International Search Report of PCT Application No. PCT/US01/42065 dated May 14, 2002.

International Search Report of PCT Application No. PCT/US01/25594 dated May 7, 2002.

G.S. Dow, et al. "Monolithic Receivers with Integrated Temperature Compensation Function", IEEE GaAs IC Symposium, 1991, pp. 267–269.

International Search Report of PCT Application No. PCT/US01/25682 dated May 14, 2002.

* cited by examiner

HIGHLY INTEGRATED SINGLE SUBSTRATE MMW MULTI-BEAM SENSOR

CROSS-REFERENCE TO RELATED APPLICATIONS

This application claims the benefit of U.S. Provisional Application No. 60/226,160, filed on Aug. 16, 2000 which application is hereby incorporated herein by reference in its entirely.

STATEMENTS REGARDING FEDERALLY SPONSORED RESEARCH

Not applicable.

FIELD OF THE INVENTION

This invention relates to radar systems and more particularly to high performance, compact, portable radar systems which are field programmable for use in a variety of different applications.

BACKGROUND OF THE INVENTION

As is known in the art, there is an increasing trend to include radar systems in commercially available products. For example, it is desirable to include radar systems in automobiles, trucks boats, airplanes and other vehicles. Such radar systems must be compact and relatively low cost.

Furthermore, some applications have relatively difficult design parameters including restrictions on the physical size of the structure in addition to minimum operational performance requirements. Such competing design requirements (e.g. low cost, small size, high performance parameters) make the design of such radar systems relatively challenging.

In automotive radar systems, for example, cost and size considerations are of considerable importance. Furthermore, in order to meet the performance requirements of automotive radar applications, (e.g. coverage area) a relatively sophisticated array antenna and radar and transmit circuitry is required.

It would, therefore, be desirable to provide a radar system having relatively high performance characteristics and which is compact, portable and relatively low cost.

SUMMARY OF THE INVENTION

The present invention provides a millimeter wave (MMW) radar system on a single low temperature ceramic substrate provided from a plurality of Low Temperature Co-fired Ceramic (LTCC) circuit layers. The single LTCC substrate has a top antenna cover or radome layer disposed over an antenna element or radiator layer. The cover or radome layer is used to tune the radiating elements on subsequent radiator layers. MMW transmitter and receiver circuit components are disposed on a second or bottom surface of the single LTCC substrate. Transmitter and receiver circuitry is integrated within the layers of the LTCC substrate to couple the antenna to the transmitter and receiver components. In one embodiment, the antenna is provided from an array of radiating antenna elements embedded in the LTCC substrate with array feed and beam-forming circuitry embedded and integrated throughout the different layers of the LTCC substrate. Transmitter circuit components including but not limited to a voltage controlled oscillator (VCO) and a power amplifier as well as receiver circuit components including but not limited to a low noise amplifier (LNA), a mixer and a video amplifier are disposed on the bottom surface of the LTCC substrate. The transmitter and receiver circuit components are coupled to transmit and receive antennas as well as other transmit and receive circuitry through via connections provided in the LTCC substrate. In this manner, a highly integrated, single substrate MMW radar system is provided.

Digital signal processing (DSP), power circuits, control circuits and interface circuits are disposed on a printed wiring board (PWB) which can be coupled to the MMW radar system disposed on the LTCC substrate via a flex cable.

In one embodiment, the LTCC substrate comprising the antenna and MMW transmit and receive circuits is disposed in a housing. The LTCC substrate is disposed in the housing over a first support structure which spaces the antenna aperture a predetermined distance from a first or internal surface of the housing. Also disposed in the housing over a second support structure is the PWB. The second structure spaces a surface of the PWB a predetermined distance from the second surface of the LTCC substrate. Thus, the LTCC substrate and the PWB are disposed in a single common housing. In one embodiment, a flex circuit couples the circuit components disposed on the LTCC substrate to the circuit components disposed on the PWB. Thus the radar is provided as an integrated structure having a relatively connector-less interface. The housing is provided having a single connector through which RF, DC and logic signals are provided. Furthermore, an EMI shield is disposed in the housing to reduce the amount of radiation emitted through the housing from locations other than the antenna aperture. While the integrated single substrate MMW radar of the present invention is particularly well-suited for automotive radar systems, especially active electronically scanned antenna automotive radar systems, it is understood that the radar may also be used in other radar system applications.

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Figure 1:
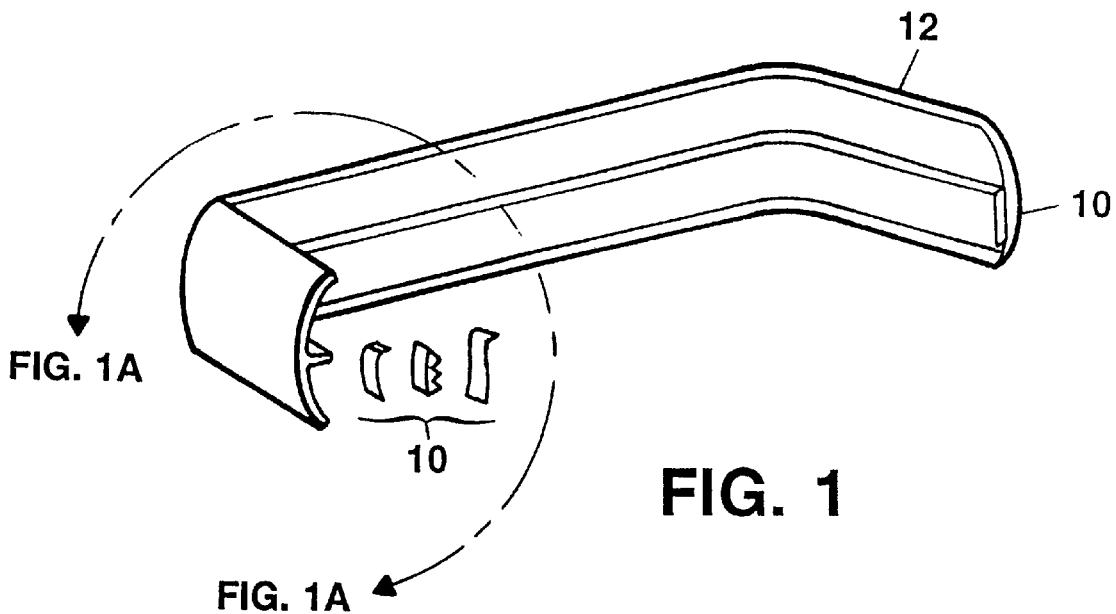
FIG. 1 is a partially exploded view of a radar system mounted to a vehicle bumper section.
Figure 1A:
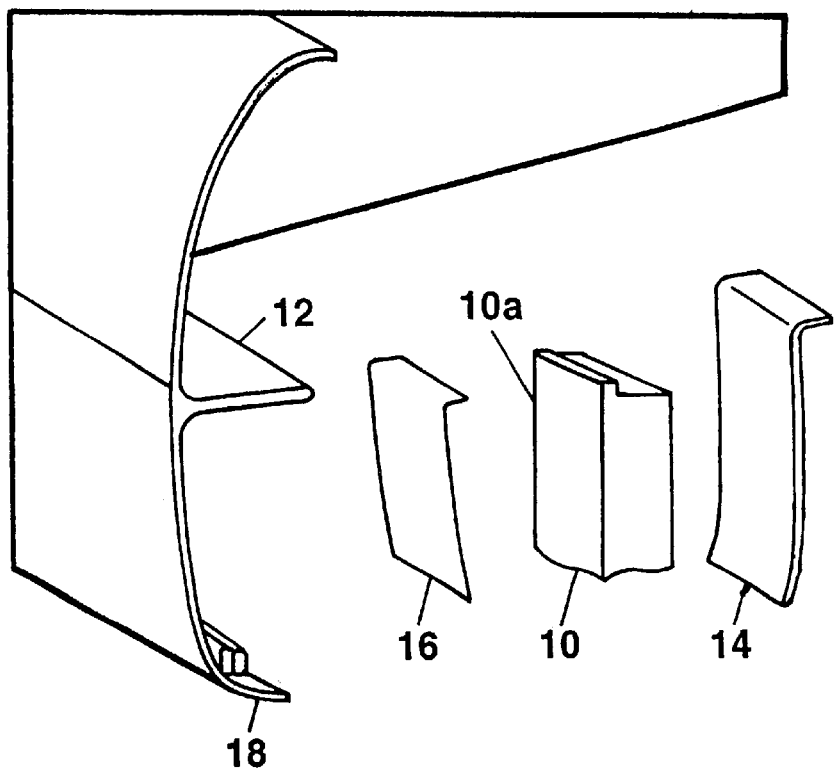
FIG. 1A is an exploded isometric view of a radar system mounted to a vehicle bumper section.

Referring to FIGS. 1 and 1A, in which like elements are provided having like reference designations, first and second radar systems 10 are mounted behind portions of a vehicle body 12. In this particular example, the vehicle body 12 corresponds to an automobile bumper 16 portion of a vehicle. It should be appreciated, however, that radar system 10 can be mounted behind any portion of a vehicle provided that an appropriate amount of space exists or can be made to accommodate the radar system 10. Radar system 10 can be provided as a highly integrated millimeter wave (MMW) multibeam sensor and thus can be mounted at various locations on a vehicle and is not limited to mounting in association with the bumper 12, as will be described below. Specific techniques for mounting a highly integrated millimeter wave (MMW) multibeam sensor behind a vehicle bumper, fascia, or other vehicle portion are described in U.S. patent application entitled System and Technique for Mounting a Radar System on a Vehicle, filed on Aug. 16, 2001, and assigned Application Ser. No. 09/930,868, assigned to the assignee of the present invention and incorporated herein by reference.

The radar systems 10 may be provided, for example, as the types described in U.S. patent application entitled Radar Transmitter Circuitry and Techniques, filed on Aug. 16, 2001, and assigned Application Ser. No. 09/931,636 and U.S. patent application entitled Switched Beam Antenna Architecture, filed on Aug. 16, 2001, and assigned application Ser. No. 09/932,574, each of which are assigned to the assignee of the present invention and incorporated herein by reference. It should be appreciated of course that other radar systems can be used in accordance with the present invention.

The radar systems 10 are each mounted behind a vehicle section 12 provided from a material which allows radar signal energy to pass therethrough with relatively little, or ideally no, attenuation. The radar system 10 can be coupled to the vehicle body 12 via a mounting bracket 14 or can be coupled directly to the body of the vehicle. A protective barrier section 16 is disposed between an inner wall 18 of the vehicle section 12 and a surface 10a of the sensor 10. The protective barrier section 16 provides additional protection for the sensor 10.

Figure 2:
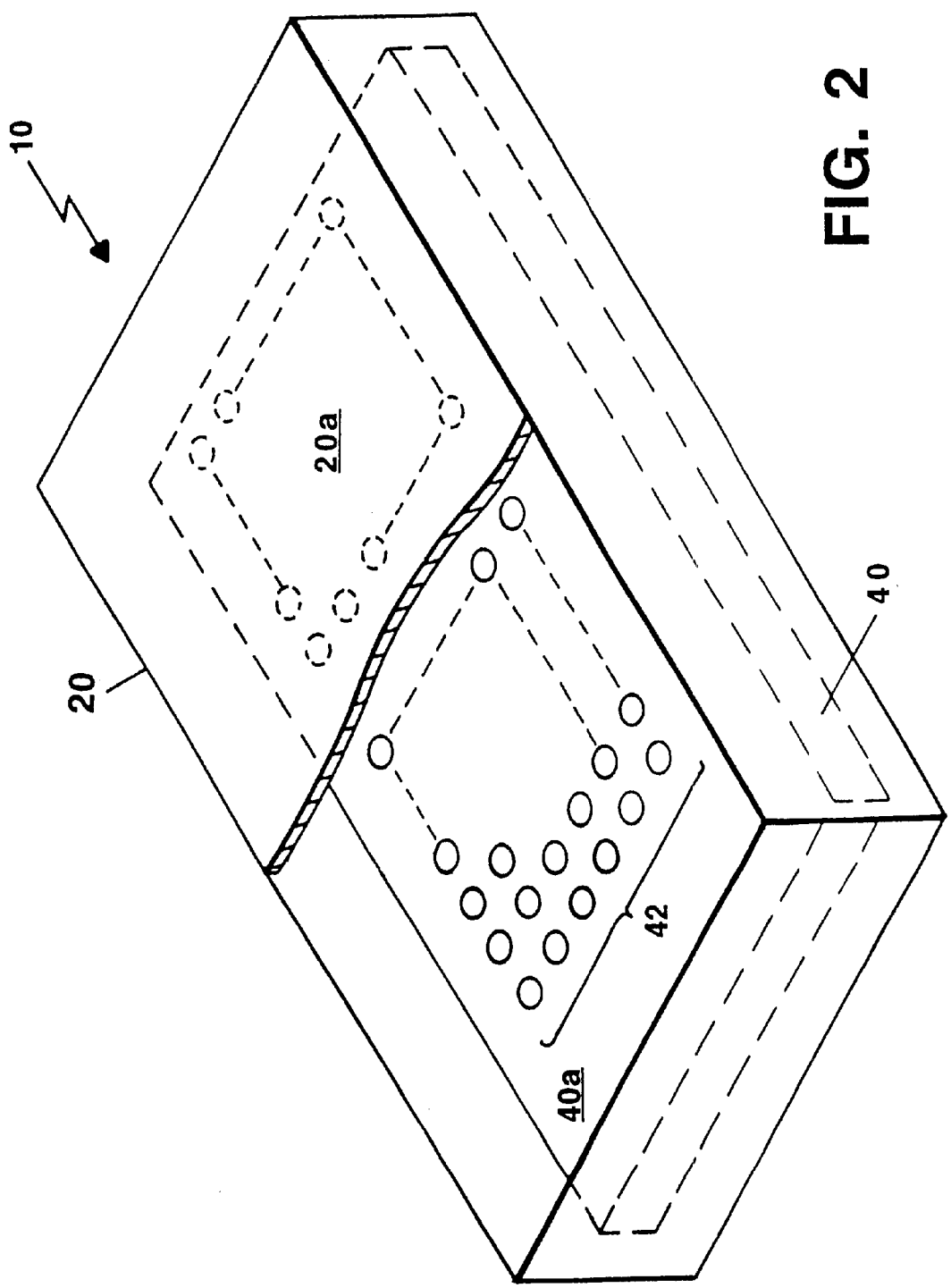
FIG. 2 is an isometric view of a highly integrated single substrate millimeter wave (MMW) multi-beam sensor system having a portion of a housing removed to reveal an antenna aperture.

Referring now to FIG. 2, the sensor 10 includes a housing 20 having a portion thereof removed to reveal a single Low Temperature Co-fired Ceramic (LTCC) substrate 40 having a first or top surface 40a on which a plurality of antenna elements 42 are disposed. A preferred antenna array and antenna element for use in automotive radar applications is described in co-pending U.S. patent application entitled "Slot Antenna Element for an Array Antenna" filed Aug. 16, 2001 and assigned application Ser. No. 09/931,633, assigned to the assignee of the present invention and the aforementioned co-pending U.S. patent application entitled "Switched Beam Antenna Architecture" both of the above-referenced applications being incorporated herein by reference in their entirety.

Also provided in the LTCC substrate 40 is a Butler matrix beam forming circuit, a radiator feed circuit coupled to the antenna elements 42 a plurality of quadrature hybrid and power divider circuits as well as interlayer transition circuits. In one embodiment, the substrate 40 is provided from Ferro's A6-M LTCC tape. The tape is provided having a thickness of about 0.010 inch pre-fired and about 0.0074 inch post-fired and a relative dielectric constant of about 5.9. The LTCC tape has a loss characteristic at 24 GHz of 1.1 dB per inch for a 0.0148 inch ground plane spacing. In other embodiments, the tape layers can be provided from Ferro's A6-S tape.

The single substrate 40 is provided from LTCC for a variety of reasons including but not limited to its potential for low cost in high volume production. Furthermore, LTCC allows compact circuit design and is compatible technology at this frequency for multi-layer circuits with large quantities of reliable, embedded vias (approximately 1200 vias in one particular embodiment). Surface-mount devices can also be integrated with LTCC as will be described below in conjunction with FIGS. 4, 5 and 7 below.

Figure 3:
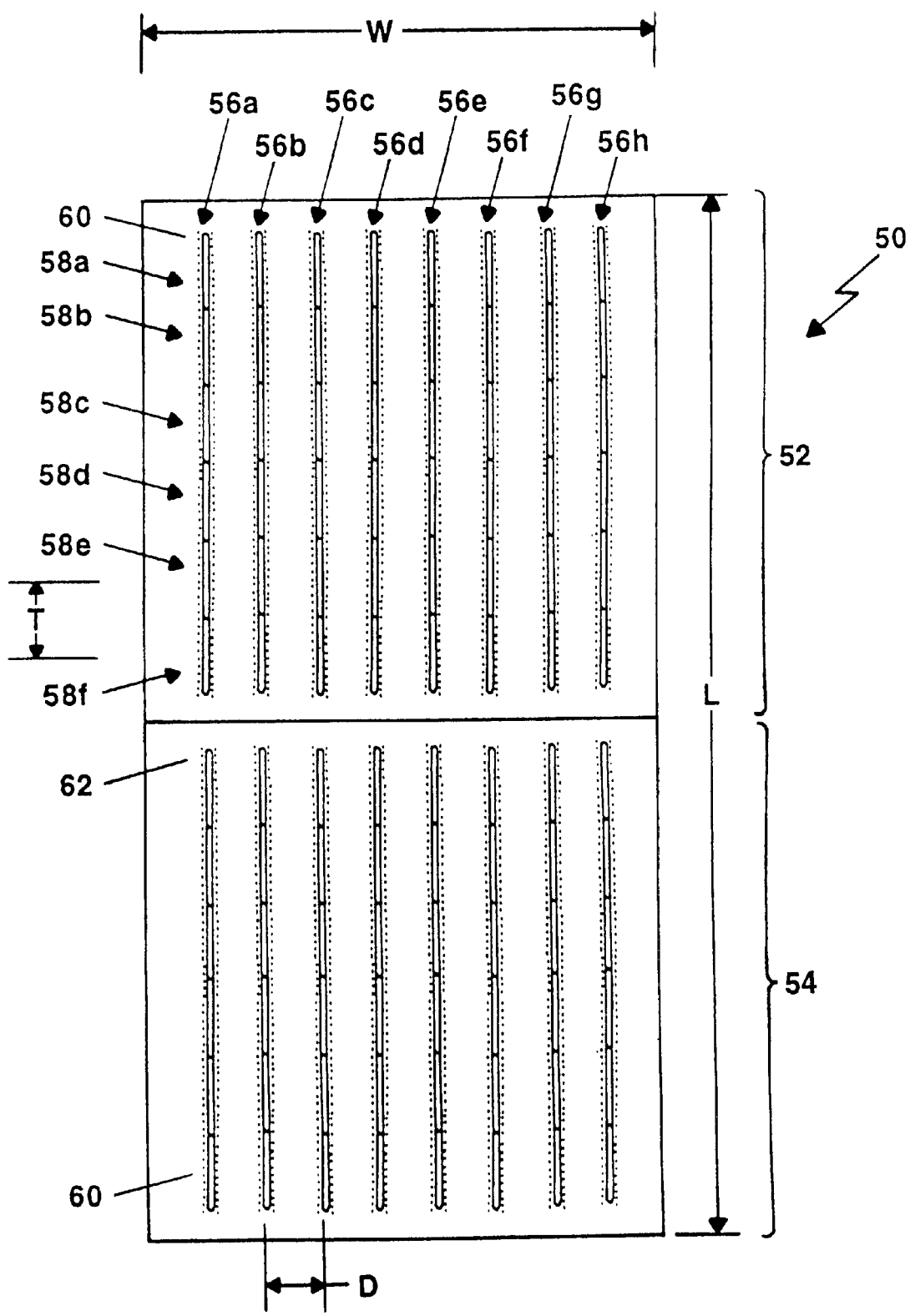
FIG. 3 is a top view of an array aperture formed by a plurality of antenna elements.

Referring now to FIG. 3, an array antenna 50 having a length L and a width W includes a transmit array 52 and a receive array 54. Each of the arrays 52, 54 includes eight rows 56a–56g and six columns 58a–58f. Thus, each of the transmit and receive arrays 52, 54 have forty-eight radiating elements (or more simply "radiators" or "elements"), generally denoted 60, with eight elements in azimuth and six elements in elevation. The array antenna 50 may be provided, for example, on the surface 40a (FIG. 2) in the LTCC substrate 40 (FIG. 2).

As described in detail in the above-mentioned U.S. patent applications entitled "Slot Antenna Element for an Array Antenna," application Ser. No. 09/931,633, filed on Aug. 16, 2001 and "Switched Beam Antenna Architecture," application Ser. No. 09/932,574, filed on Aug. 16, 2001 each radiating element 60 is a stripline-fed open-ended cavity in LTCC. The cavity is formed in the LTCC 40 (FIG. 2) using embedded vias, generally denoted 62, that create the "cavity walls." Each of the arrays 52, 54 have a rectangular lattice spacing: 0.223" (azimuth)×0.295" (elevation). The azimuth spacing is selected to be compatible with a Butler matrix feed circuit selected to yield desired beam locations which provided desired detection zones. The elevation spacing is selected to achieve a desired elevation beamwidth and the maximum spacing needed to avoid a cover induced scan blindness.

In an automotive radar application, the antenna 50 is enclosed in the housing 12 (FIG. 2) and radiates through the housing cover 12a (FIG. 2). In some embodiments, the cover 12 is incorporated into the radiator design while in other embodiments the cover is spaced from the antenna aperture by a distance corresponding to one-half wavelength.

Figure 4A:
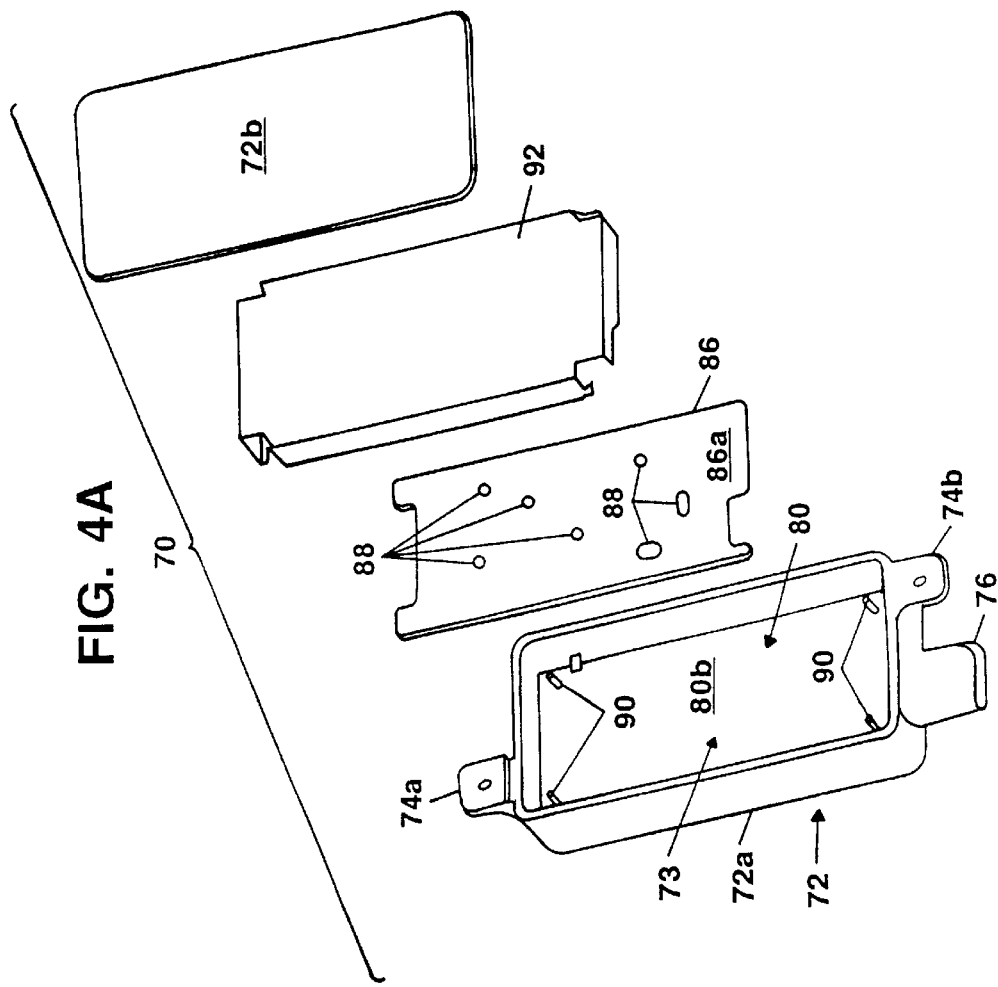
FIG. 4A is an exploded isometric view of a highly integrated single substrate MMW multi-beam sensor system.
Figure 4:
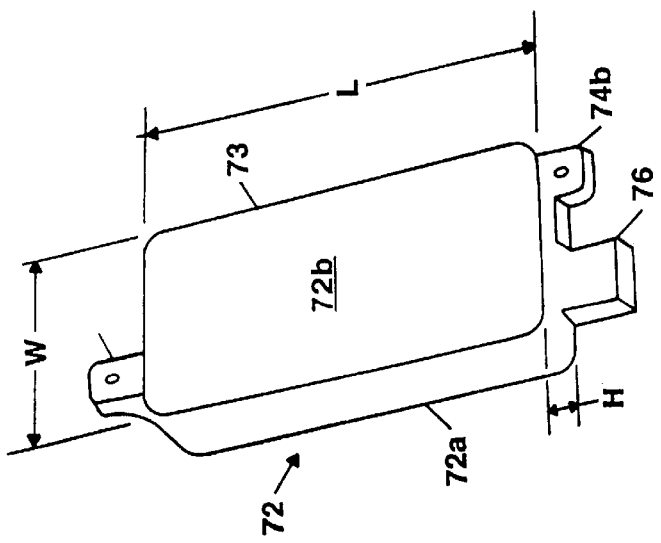
FIG. 4 is an isometric view of a highly integrated single substrate MMW multi-beam sensor system.
Figure 5:
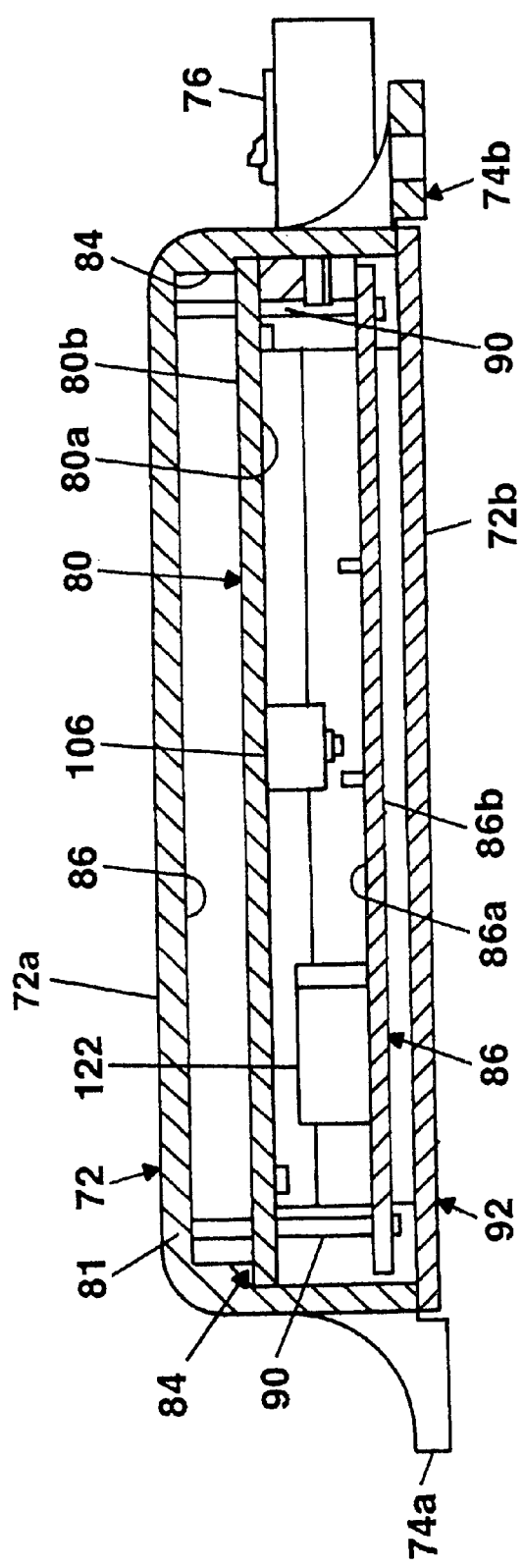
FIG. 5 is a cross-sectional view of a highly integrated single substrate MMW multi-beam sensor system of the type shown in FIGS. 1, 2 and 4.

Referring now to FIGS. 4, 4A and 5 in which like elements are provided having like reference designations throughout the several views, a highly integrated MMW multi-beam sensor system 70 includes a housing 72 having a pair of mounting ears 74a, 74b and a connector 76 projecting therefrom. RF, DC and logic signals are provided to and from the sensor 70 via the connector 76. In one embodiment, the housing 72 is provided having a length L typically of about 120 mm, a width W typically of about 66 mm, and a height H typically of about 32 mm and all signals provided to and from the sensor 70 are provided through the connector 76 to a car area network (CAN) controller as will be described below in conjunction with FIG. 6.

The housing 72 includes a base portion 72a and a cover portion 72b. In this particular embodiment, the base portion 72a is provided having integral sides to thus provide a recess region 73 within the base 72a. The base 72a may be provided using injection molding techniques of any other technique well known to those of ordinary skill in the art of providing structurally sound, compact and lightweight structures.

The base 72a side walls have a support structure 84 projecting therefrom. In one particular embodiment, the support structure 84 corresponds to a shoulder region 84 of the base 72a. Also projecting from a surface of base 72a is a second support structure here provided from a plurality of posts 90. In this particular embodiment, the posts 90 project from a bottom surface of the base 72a.

An LTCC substrate 80 having first and second opposing surfaces 80a, 80b (80b not visible in FIG. 4) is disposed in the recess region 73 of the base 72a. An antenna, which may be provided for example as the type described above in conjunction with FIG. 3 is disposed on surface 80b. The antenna on the substrate 80 is thus disposed to transmit and receive signals through the bottom surface of base 72a. The LTCC substrate 80 is disposed is the recess region 73 and supported on the shoulder portion 84 provided in the base 72a. The shoulder region 84 is provided to support the substrate 80 and space the aperture of the antenna provided on the LTCC substrate 80 a predetermined distance from a surface of the housing portion 72a as will be described in more detail below in conjunction with FIG. 5.

A printed circuit board (PCB) 86 having first and second opposing surfaces 86a, 86b is also disposed in the recess region 73 of the housing 72. PCB 86 is adapted to have circuit components 88 including but not limited to surface mounting circuit components disposed on the opposing surfaces 86a, 86b. The circuit components 88 may be provided as inductors, power supplies and digital circuit components and subsystems.

The PWB 86 is also disposed in the recess region 73 and is supported by spacers 90. The spacers 90 are selected to space a first surface of the PWB 86 a predetermined distance from the surface 80a of the LTCC substrate 80. The particular distance by which PWB 86 is spaced from LTCC substrate 80 is selected such that the circuit components disposed on the surface 80a of substrate 80 do not interfere with either circuit components 88 disposed on the surface 86b of PWB 86 or with the surface 86b itself.

An EMI shield 92 is disposed over the PWB 86 and provides a barrier which prevents leakage of substantially all radiation from the LTCC substrate 80 and the circuits provided therewith as well as PWB 86 and the circuits provided therewith. The shield 92 also provides a level of immunity from radiated emissions coming from outside the sensor 70. The cover 72b is provided having a thickness selected to allow attachment to the base 72a via a vibrational technique.

Figure 6:
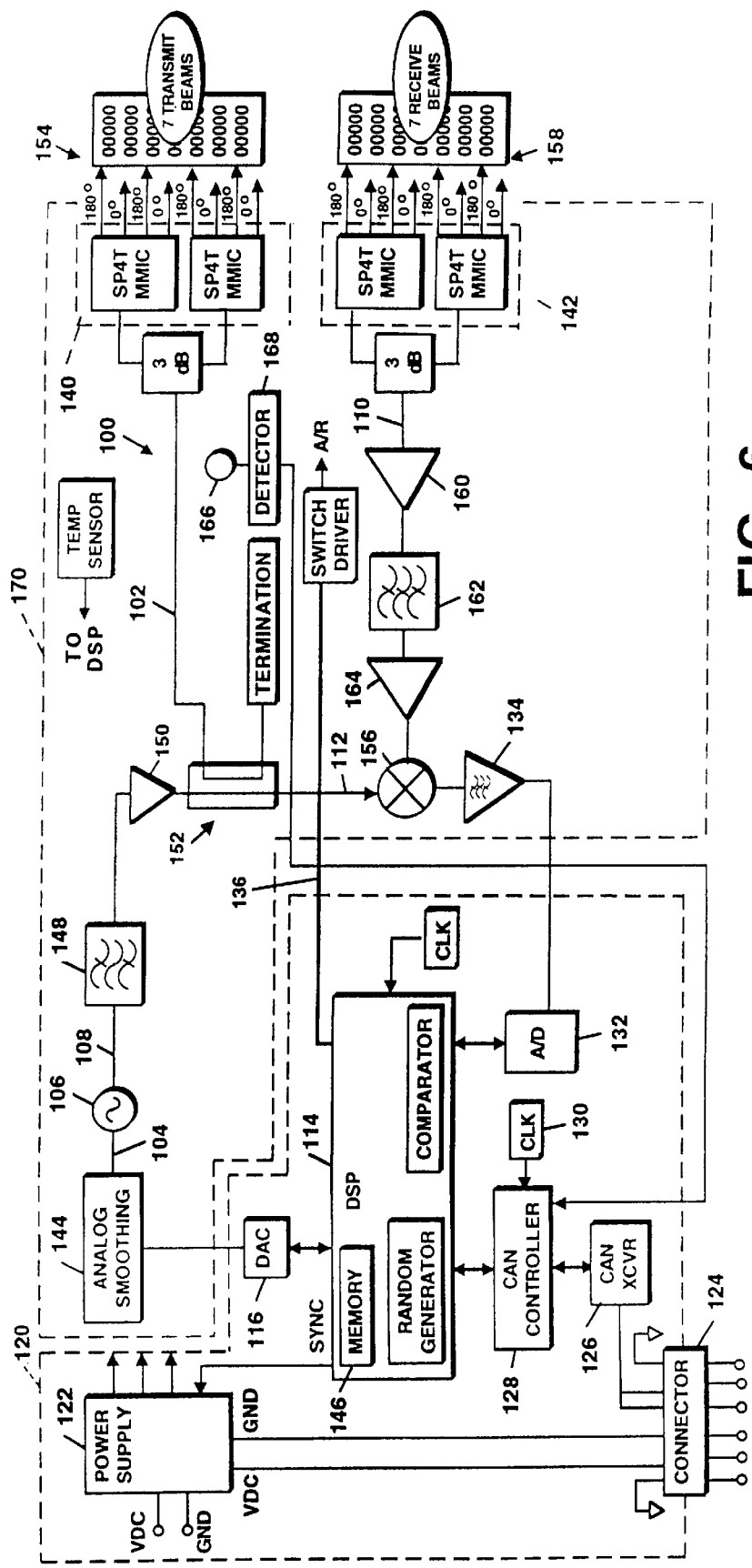
FIG. 6 is a detailed block diagram of a highly integrated single substrate MMW multi-beam sensor system of the type shown in FIGS. 1, 2 and 4.

Referring now to FIG. 6, a radar system which may be similar to the radar systems described above in conjunction with FIGS. 1 and 2 respectively for use as a side object detection (SOD) system in an automotive radar application is shown in greater detail. In general overview of the operation of a transmitter 100, the FMCW radar transmits a signal 102 having a frequency which changes in a predetermined manner over time. The transmit signal 102 is generally provided by feeding a VCO control or ramp signal 104 to a voltage controlled oscillator (VCO) 106. In response to the ramp signal 104, the VCO 106 generates a chirp signal 108.

A measure of transmit time of the RF signal can be determined by comparing the frequency of a received or return signal 110 with the frequency of a sample 112 of the transmit signal. The range determination is thus provided by measuring the beat frequency between the frequencies of the sample 112 of the transmit signal and the return signal 110, with the beat frequency being equal to the slope of the ramp signal 104 multiplied by the time delay of the return signal 110.

The measured frequency further contains the Doppler frequency due to the relative velocity between the target and the radar system. In order to permit the two contributions to the measured frequency shift to be separated and identified, a CW tone is generated after the chirp so that the return signal from it differs solely by the Doppler frequency.

In one embodiment, the VCO control signal 104 is generated with digital circuitry and techniques. In a preferred embodiment, the ramp signal 104 is generated by a DSP 114 and a digital-to-analog converter (DAC) 116. Use of the DSP 114 and DAC 116 to generate the ramp signal 104 is possible in the SOD system of FIG. 6 since, it has been determined that by proper selection of the detection zone characteristics including but not limited to detection zone size, shape and resolution, precise linearity of the chirp signal 108 is not necessary. With this arrangement, the frequency of the transmit signal 102 is accurately and easily controllable which facilitates implementation of several features. As one example, one or more characteristics of successive ramps in the ramp signal 104 are randomly varied in order to reduce interference between similar, proximate radar systems. As another example, temperature compensation is implemented by appropriately adjusting the ramp signal 104. Yet another example is compensation for non-linearity in the VCO operation. Further, changes to the SOD system which would otherwise require hardware changes or adjustments can be made easily, simply by downloading software to the DSP 114. For example, the frequency band of operation of the SOD system can be readily varied, as may be desirable when the SOD is used in different countries with different operating frequency requirements.

An electronics portion 120 of the SOD system includes the DSP 114, a power supply 122 and a connector 124 through which signal buses are coupled between the SOD system and a vehicle on which the SOD system is disposed. A digital interface unit is provided in the form of a controller area network (CAN) transceiver (XCVR) 126 which is coupled to the DSP 114 via a CAN microcontroller 128. The CAN controller 128 has a system clock 130 coupled thereto to provide frequency stability. In one embodiment, the system clock is provided as a crystal controlled oscillator. An analog-to-digital (A/D) converter 132 receives the output of a video amplifier 134 and converts the signal to digital form for coupling to the DSP 114 for detection processing. In one embodiment, the A/D converter 132 is provided as a twelve bit A/D converter. Those of ordinary skill in the art will appreciate, however, that any A/D converter having sufficient resolution for the particular application may be used. A signal bus 136 is coupled to antenna switch circuits 140, 142 in order to provide control signals to drive the switches which comprise the switch circuits. Also provided in the electronics portion 120 of the SOD system is a memory in which software instructions, or code and data are stored. In the illustrative embodiment of FIG. 6, the memory is-provided as a flash memory.

The DSP provides output signals, or words to the DAC which converts the DSP output words into respective analog signals. An analog smoothing circuit 144 is coupled to the output of the DAC in order to smooth the stepped DAC output to provide the ramp control signal to the VCO. The DSP includes a memory device 146 in which is stored a look-up table containing a set of DSP output signals, or words in association with the frequency of the transmit signal generated by the respective DSP output signal.

The VCO 106 receives ramp signal 104 from the analog smoothing circuit 144. In one embodiment, the VCO operates in the transmit frequency range of between 24.01 to 24.24 GHz and provides an output signal to bandpass filter 148, as shown.

The output of the VCO 106 is filtered by the bandpass filter 148 and amplified by an amplifier 150. A portion of the output signal from amplifier 150, is coupled via coupler 152 to provide the transmit signal 102 to a transmit antenna 154. Another portion of the output signal from the amplifier 150 corresponds to a local oscillator (LO) signal fed to an LO input port of a mixer 156 in the receive signal path.

The switch circuits 140, 142 are coupled to the receive and transmit antennas 154, 158 through a Butler matrix (not shown in FIG. 6). The antennas 154, 158 and switch circuits 140, 142, and Butler matrix can be of the type described in the above-referenced patent applications entitled Slot Antenna Element for an Array Antenna and Switched Beam Antenna Architecture. Suffice it here to say that the switch circuits and Butler matrix operate to provide the antenna having a switched antenna beam with antenna beam characteristics which enhance the ability of the SOD system to detect targets.

The received signal 110 is processed by an RF low noise amplifier (LNA) 160, a bandpass filter 162, and another LNA 164, as shown. The output signal of the RF amplifier 164 is down-converted by mixer 156 which receives the local oscillator signal coupled from the transmitter, as shown. Illustrative frequencies for the RF signals from the amplifier 164 and the local oscillator signal are on the order of 24 GHz. Although the illustrated receiver is a direct conversion, homodyne receiver, other receiver topologies may be used in the SOD radar system.

The video amplifier 134 amplifies and filters the down-converted signals which, in the illustrative embodiment have a frequency between 1 KHz and 40 KHz. The video amplifier may incorporate features, including temperature compensation, filtering of leakage signals, and sensitivity control based on frequency, as described in a co-pending U.S. patent application entitled "Video Amplifier for a Radar Receiver," application Ser. No. 09/931,593, filed on Aug. 16, 2001, and incorporated herein by reference in its entirety.

The A/D converter 132 converts the analog output of the video amplifier 134 into digital signal samples for further processing. In particular, the digital signal samples are processed by a fast Fourier transform (FFT) within the DSP in order to determine the content of the return signal within various frequency ranges (i.e., frequency bins). The FFT outputs serve as data for the rest of the signal processor 262 in which one or more algorithms are implemented to detect objects within the field of view, as described in co-pending U.S. patent application entitled "Radar Transmitter Circuitry and Techniques," application Ser. No. 09/931,636, filed on Aug. 16, 2001, and incorporated herein by reference in its entirety.

The radar system includes a temperature compensation feature with which temperature induced variations in the frequency of the transmit signal are compensated by adjusting the ramp signal accordingly. For this purpose, the transmitter 100 includes a DRO 166 coupled to a microwave signal detector 168. The output of the microwave detector is coupled to an analog-to-digital converter of the CAN controller 128 for processing by the DSP 114. The details of such processing are described in the aforementioned U.S. patent application Ser. No. 09/931,636, filed Aug. 16. 2001, entitled "Radar Transmitter Circuitry and Techniques."

In one embodiment, the apertures of the transmit and receive antenna array 154, 158 form surface 80a of the LTCC substrate 80. The RF circuit components which provide the RF transmitter and receiver components denoted 170 are all included either within or on the LTCC substrate 80. For example, filter 148, coupler 152 and various printed circuit transmission lines provided within the layers of the substrate 80 as will be described below in conjunction with FIG. 7.

VCO 106 is provided as a surface mount component disposed on a surface of the substrate 80. Similarly amplifiers 150, 160, 164 and mixer 156 may all be provided as monolithic microwave integrated circuits (MMICs) and disposed on a surface of the substrate 80.

Similarly, those components which comprise electronics portion 120 are disposed on the PWB 86. For example, DSP 114, DAC 116, power supply 122, LAN XCVR and controller 126, 128 and AD 132 are all disposed on first or second surfaces 86a, 86b of the PWB 86. In this manner, the sensor 70 is provided as an entire radar system in a compact package.

Figure 7:
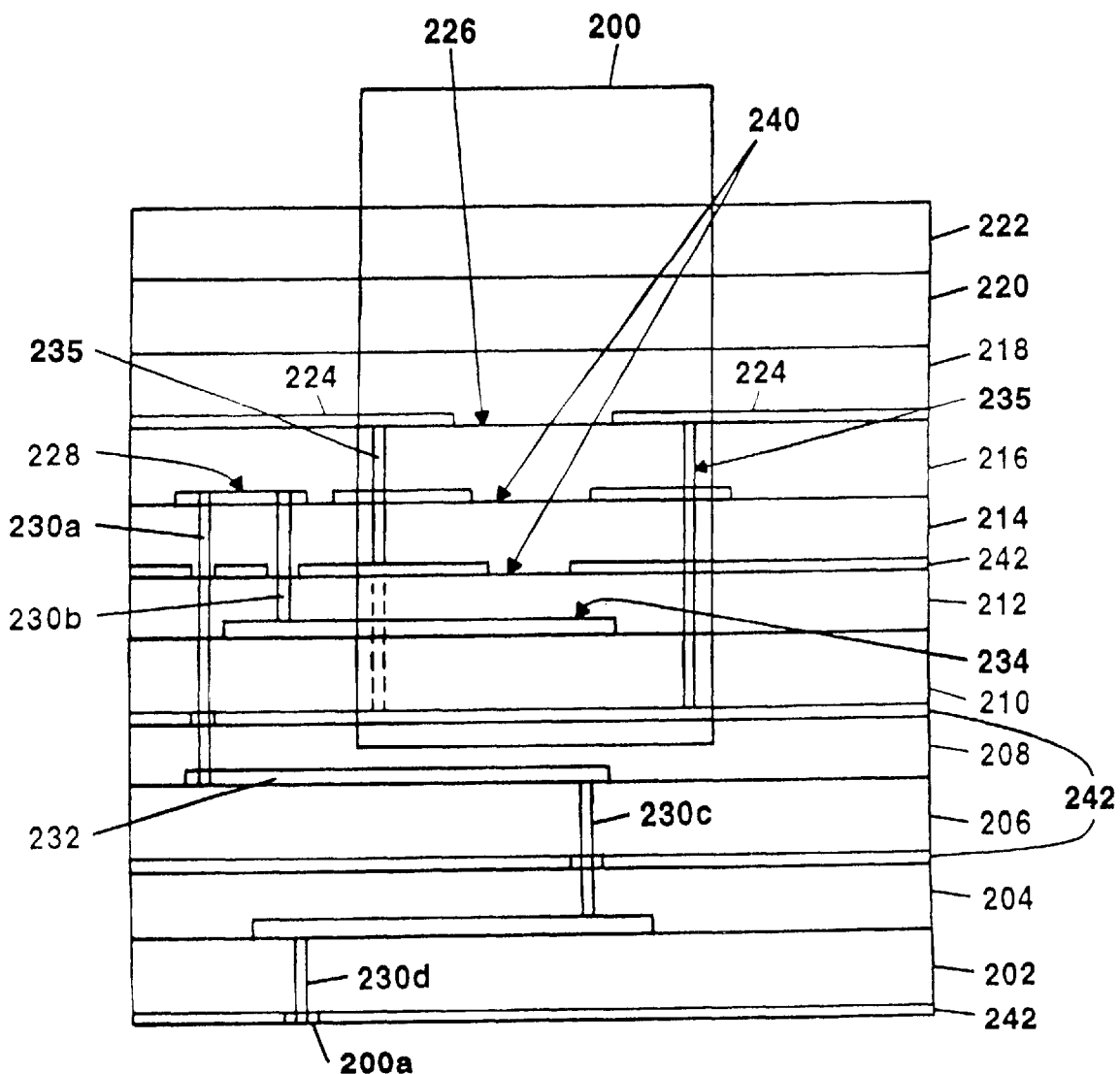
FIG. 7 is a cross-sectional view of a single substrate which includes and RF antenna, receiver and transmitter circuits.

Referring now to FIG. 7, a radiating element 200 and associated feed circuits are provided from twelve 0.0074" tape LTCC layers 202–222 with a (stripline) ground plane spacing of 0.0148."

The radiating element 200 itself is provided from layers 210–222 as shown. It should be noted that cover layers 218–222 are integral to the element 200. Layer 216 has a ground plane 224 disposed thereon. Portions of the ground plane are removed to form an aperture 226.

A power divider circuit 228 is coupled through conductive vias 230a, 230b to a conductive trace 232 and a strip line feed circuit 234, respectively. Thus, an elevation feed circuit is interlaced with the element 200.

Capacitive windows 240 are formed on layers 214, 216 via by disposing ground planes material on the layers 214, 216 and providing openings in the ground planes. Layers 202, 204 and 208 are also provided having ground planes 242 disposed thereon. Layers 202–208 are dedicated to a Butler Matrix circuit while layers 210–216 are dedicated to the radiator and feed circuit.

A plurality of embedded vias 235 in the LTCC are used for forming the waveguide structure of the radiator in the LTCC while vias 230a, 230b are used for transitioning between the circuits on the different layers. The embedded vias 235 form a waveguide structure and share the same layers as the power divider circuit 228 and the radiator feed circuit 234.

The LTCC manufacturing flow comprises eight generic operations which are defined as: tape blanking, via formation, via filling, conductor deposition, lamination, wafer firing, continuity test, and dicing. The following is a brief description of each of the eight core work centers.

Raw LTCC is supplied in tape form on spools having a standard width of either 7" or 10". Typical tape area per roll ranges from 4200 to 6000 sq. in. and is also predetermined at time of order. The blanking of LTCC tape is performed manually with the use of an arbor blanking die. Tape is blanked to either a 5" or a 7" manufacturing format size. An orientation hole is also introduced during the blanking operation which references the LTCC tape's ascast machine and transverse directions. This orientation hole will ultimately allow for layers to be identified and cross-plied in order to optimize total product shrinkage at firing.

The creation of Z-axis via holes is performed through the use of a high speed rapid punch system. The system is driven by punch CAD/CAM data which is electronically down loaded via Ethernet directly to the manufacturing work cell. The supplied punch files contain X- Y-coordinate locations for via formation. Individual tape layers, in either a 5" or 7" format, are mounted into single layer tape holders/frames. These framed layers are subsequently loaded into a handling cassette which can house a maximum of 25 LTCC tape layers. The cassette is loaded and is handled automatically at the work center when respective punch programs are activated. The high speed punch processes via holes in tape layers individually and ultimately indexes through the entire cassette. Via holes are formed at typical rates of 8 to 10 holes per second. At the completion of via formation for a particular tape layer the cassette is unloaded from the work center, processed tape layers removed, and the cassette is reloaded for continued processing.

LTCC tape layers which have completed respective via formation operations require the insertion of Z-axis conductors in order to ultimately establish electrical interface with upper and lower product layers. The via filling operation requires the use of positive pressure displacement techniques to force conductive pastes into via formed holes in the dielectric tape. Mirror image stencils are manufactured for respective tape layers which feature all punched via hole locations; these stencils are fixtured on a screen printing work cell. LTCC tape layers are soft fixtured onto a porous vacuum stone. The stone is indexed under the stencil where a preset pressure head travels over the stencil forcing deposited conductor paste through the stencil and into the dielectric tape. Each tape layer is processed in a similar fashion; all layers are dried, driving off solvents, prior to follow on operations.

Via filled dielectric tape layers require further processing to establish X- and Y-axis conductor paths. The deposition of these conductor mediums provides "from-to" paths on any one LTCC layer surface and originate from and terminate at filled via locations. The conductor deposition operation employs the same work center as described in the via filling operation with the exception that wire mesh, emulsion patterned screens are substituted for through hole stencils. The technique for fixturing both the screen and the tape product is also the same. All product layers are serially processed in this fashion until deposition is complete; again, all layers are dried prior to follow on operations.

Prior to lamination all previous tape processing operations occur in parallel with yield fallout limited to respective layer types. The lamination operation requires the collation and marriage of parallel processed layers into series of independent wafers. Individual layers, (layers 1,2,3, . . . n), are sequentially placed upon a lamination caul plate; registration is maintained through common tooling which resides in all product layers. The collated wafer stack is vacuum packaged and placed in an isostatic work cell which provides time, temperature, and pressure to yield a leathery wafer structure.

Laminated wafers are placed on firing setters and are loaded onto a belt furnace for product densification. Firing is performed in a single work cell which performs two independent tasks. The primary operation calls for the burning off of solvents and binders which had allowed the tape to remain pliable during the via formation, filling, conductor deposition, and lamination operations. This binder burnout occurs in the 350–450 C. range. The wafer continues to travel down the belt furnace and enters the peak firing zone where crystallization, and product densification occurs; temperatures ranging to 850–860 C. are typical. Upon cool down the wafers exit the furnace as a homogenous structure exhibiting asfired conditions. All product firing occurs in an air environment. Post firing operations would not require wafers to be processed through an additional binder burnout steps but would only require exposure to the 850 C. densification temperatures.

Continuity net list testing is performed on individual circuits in wafer form. Net list data files are Ethernet down loaded to the net probe work center and are exercised against respective wafer designs. Opens and shorts testing of embedded nets, and capacitance and resistive load material measurements defines the bulk work center output. Failures are root caused to specific net paths.

Net list tested wafers typically exhibit individual circuit step/repeat patterns which can range from one to fifty or more on any one particular wafer. Conventional diamond saw dicing techniques are employed to singulate and dice circuits out of the net list tested wafers. Common fixturing is in place to handle both 5" and 7" fired wafer formats.

Figure 8A:
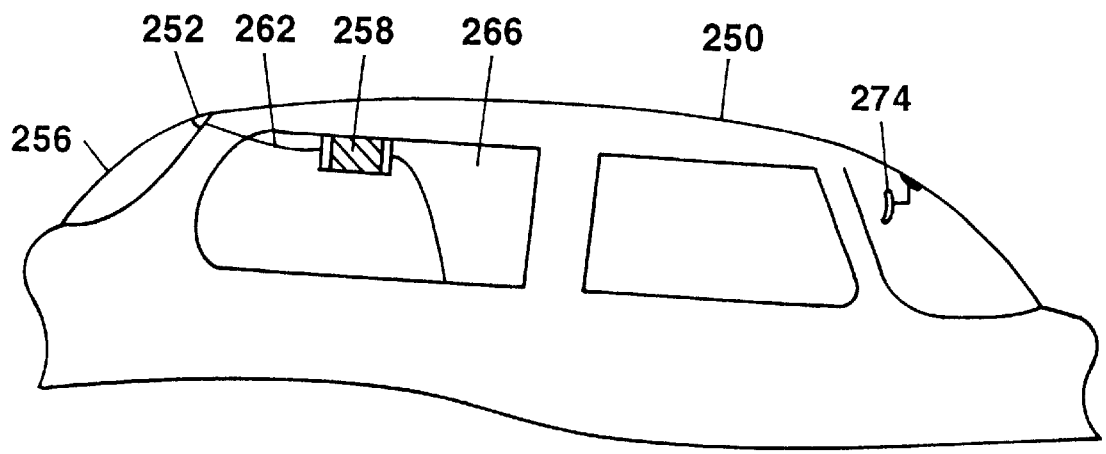
FIG. 8A is a side view of the highly integrated single substrate MMW multi-beam sensor system of shown in FIG. 8.
Figure 8:
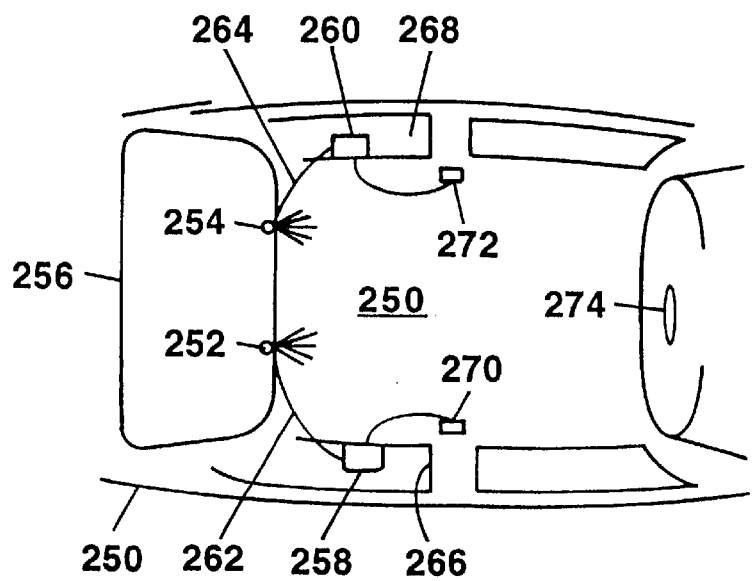
FIG. 8 is a top view of a highly integrated single substrate MMW multi-beam sensor system of the type shown in FIGS. 1, 2 and 4 disposed on a vehicle.

Referring to FIGS. 8 and 8A, in which like elements are provided having like reference designations, a vehicle 250, here shown as an automobile, has a pair of radar displays 252, 254, for example lights or LEDs, mounted to a surface of a rear window 256 of the automobile 250. In this particular embodiment, the displays 252, 254 are disposed on an inner surface of the rear window 256. The radar displays are coupled to portable radar sensors 258, 260. In one particular embodiment, the radar displays 252, 254 are coupled sensors 258, 260 via respective ones of wires 262, 264. In other embodiments, however, a wireless connection can be used between the displays 252, 254 and sensors 258, 260. The radar sensors 258, 260 may be provided, for example, as the types described above in conjunction with FIGS. 1–7 and/or as described in co-pending U.S. patent application Ser. No. 09/931,276, filed Aug. 16, 2001, and entitled Portable Object Detection System, assigned to the assignee of the present invention and hereby incorporated herein by reference in its entirety.

The radar sensors 258, 260 are each portably mounted to the interior surface of the side windows 266, 268. The radar sensors 252, 254 can be mounted to window brackets or can be mounted directly on the windows 266, 268. Wires 270, 272 couple respective ones of the radar sensors 258, 260 to a power source (not shown) such as a car battery or other power source provided as part of the vehicle 250. It should be appreciated, however, that alternative power sources, such as rechargeable or non-rechargeable batteries, can also be used to provide power to the sensor.

In operation, if one of sensors 258, 260 detects an object within its detection zone, the sensor causes the corresponding display 252, 254 to provide an indication that a sensor has detected an object in its detection zone. An operator of the vehicle 250 receives the indication, via a conventional rear view mirror 274 in which the operator can see radar displays 252, 254. In this manner, the detection system alerts the operator of the vehicle to the presence of the object within the detection zone associated with each radar sensor 258, 260.

Alternatively, or in addition to visual indications provided by the displays 252, 253, the sensors 258, 260 can provide an audible indication of a detected object with an audible alert device. Though not shown in the figure, it will be recognized by one of ordinary skill in the art that the audible indication can be provided by an audible alert device within the radar displays 252, 254, or the radar sensors 258, 260 or with a separate audible alert device. In some embodiments, it may be desirable, or even necessary to utilize only an audible alert device and in this case, the radar displays 252, 254 are optional.

Although two radar systems and two displays are here shown and described, it should be appreciated that fewer or more than two radar systems and displays can also be used. The particular number of radar systems and displays to use in any particular application is selected in accordance with a variety of factors including but not limited to the size and shape of the vehicle, the number of blind spots on the vehicle and the location of vehicle blind spots. Also, it will be recognized that in some embodiments, two or more radar systems may be mutually coupled to one radar display. Likewise one, two, or more displays can be coupled to a single radar sensor. Furthermore, while the illustrative embodiment shows the radar system disposed internal to the vehicle 250, on the interior surface or the side windows, the radar system could also be disposed external to the vehicle, for example on the exterior surface of the side windows.

Figure 9:
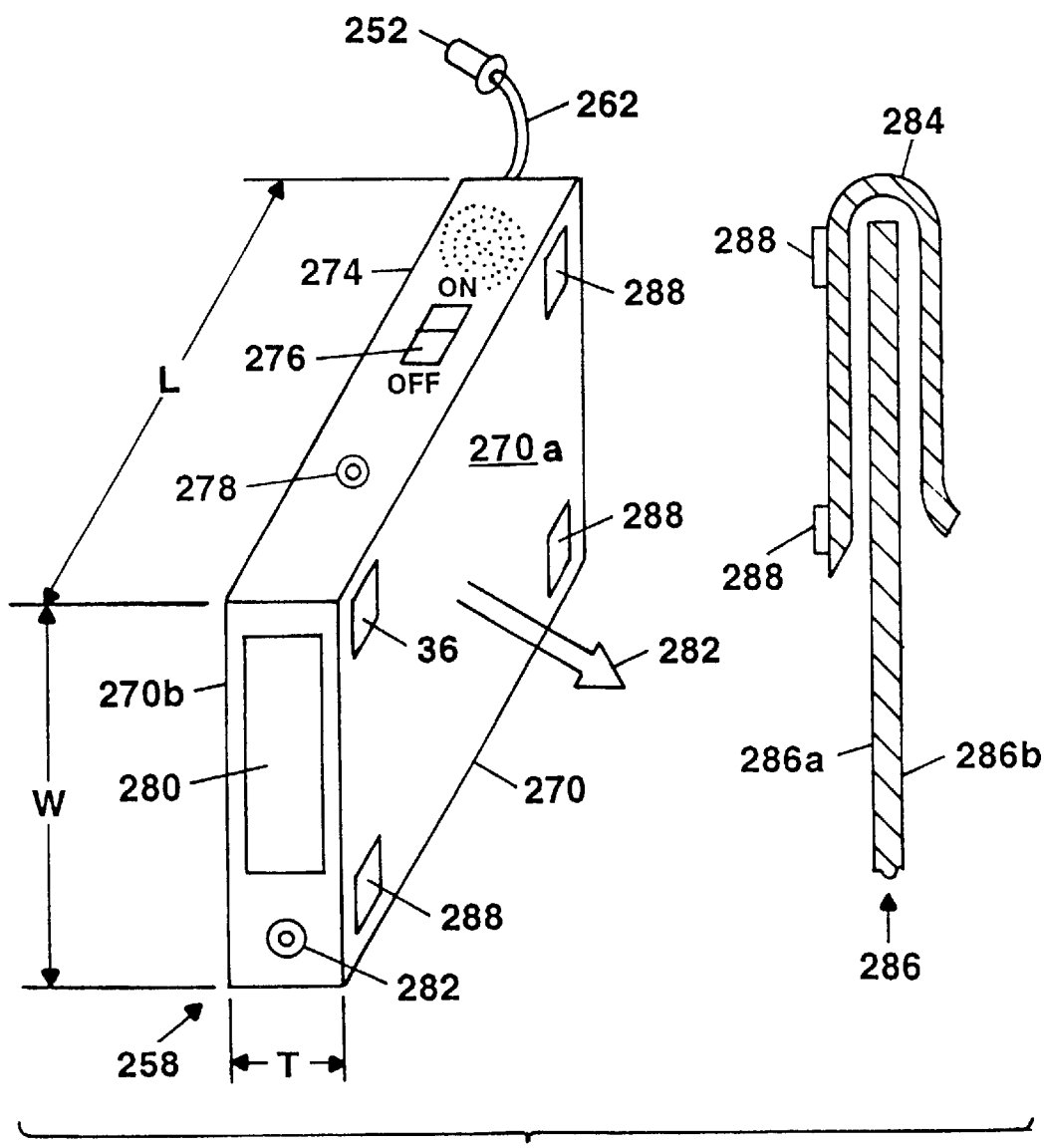
FIG. 9 is an isometric view of a highly integrated single substrate MMW multi-beam sensor system.

Referring now to FIG. 9 in which like elements of FIGS. 8 and 8A are provided having like reference designations, the portable sensor 258 is shown to include a housing 270 having first and second opposing surfaces 270a, 270b. An antenna system (not visible in FIG. 9) radiates RF energy through the first surface 270a of the housing 270. Disposed in the housing 270 are one or more radiating sensor elements provided as part of a highly integrated millimeter wave (MMW) substrate. Disposed on the housing 270 is an audio output port 274 for an audio detection alert, and audio alert on/off switch 276, a display connector 278 for attachment of a radar display cable, a battery port 280 for attachment of batteries in the alternative power arrangement, and a connector 282 for attachment of vehicle power logic and other signals. The LED 252 is coupled to the sensor 258 via an electrical connection 262.

RF energy 282 radiates through the face 270a to detect objects. The sensor 258 can be mounted to a vehicle via a variety of techniques. As explained above in conjunction with FIGS. 1 and 1A, for example, the sensor can be mounted internally to or behind to a portion of the vehicle (e.g. including but not limited to under the vehicle body or skin or shell or cover or behind a vehicle bumper, side panel and vehicle fascia). Also, the sensor can be mounted externally to the vehicle. As shown in FIG. 9, for example, a clip 284 couples the sensor 258 to an inner surface 286a of an vehicle window 286. In alternate embodiment, the sensor 258 may be coupled to outer window surface 286b. The sensor 258 may be, for example, coupled with a hook and loop fastener system generally denoted 288. The illustrative clip 284 is placed over a top edge of the window 286 of the vehicle and the radar sensor 258 is attached to the clip 284 with hook and loop fasteners 288. In this manner, sensor 258 is removably coupled and thus portably mounted to the vehicle.

An illustrative sensor 258 is provided having a length L of 12.7 cm, a width W of 7.6 cm and a thickness T of 3.8 cm where the thickness corresponds to the distance between the two surfaces 272a, 272b. It will be recognized by one of ordinary skill in the art that sensor systems with other dimensions can also be used. It will be further recognized that other external mounting structures and techniques in addition to the clip 284 are possible.

It will be further recognized by one of ordinary skill in the art that other techniques in addition to the connector 282 can be used to provide power to the sensor 258. It will be further recognized by one of ordinary skill in the art that the sensor 258 can be mounted to any window or to any interior or exterior surface of the vehicle, so long as the radiating face 272a is not placed behind a surface through which radar energy cannot propagate effectively. Furthermore, it should be understood that it is necessary to orient the sensor 258 in a particular direction to provide a preferred detection zone about the vehicle.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims.

All publications and references cited herein are expressly incorporated herein by reference in their entirety.

What is claimed is:

1. A radar sensor comprising:

a housing having a base portion and a cover portion;

a first substrate having first and second opposing surfaces; said first substrate disposed in the base portion of said housing;

an antenna disposed on the first surface of said first substrate, said antenna having an antenna aperture disposed to radiate through a portion of the base portion of said housing;

an RF transmit circuit disposed on the second surface of said first substrate, said RF transmit circuit coupled to said antenna;

an RF receiver circuit disposed on the second surface of said first substrate, said RF receiver circuit coupled to said antenna;

a second substrate disposed in the base portion of said housing above said first substrate, said second substrate having first and second opposing surfaces;

one or more IF circuit components disposed on a first one of the first and second opposing surfaces of said second substrate, means for coupling at least one of the RF transmit and RF receiver circuits to at least one said one or more IF circuit components; and an EMI shield disposed over said first and second substrates to reduce the amount of EMI radiated from the sensor.

2. The sensor of claim 1 wherein said first substrate comprises a low temperature co-fired ceramic (LTCC) substrate.

3. The sensor of claim 2 wherein the LTCC substrate comprises a plurality of layers comprising LTCC tape, each of the plurality of layers coupled to a corresponding one of the plurality of layers by corresponding ones of a plurality of conductive vias.

4. The sensor of claim 3 wherein said antenna is comprised of a plurality of antenna elements, each of said plurality of antenna elements provided from resonant structures formed by conductive vias embedded in said plurality of tape layers.

5. The sensor of claim 4 wherein said second substrate comprises a printed circuit board (PCB).

6. The sensor of claim 5 wherein said means for coupling circuits to the IF circuit components comprises a flex circuit.

7. A radar sensor comprising:
a housing having:
a base portion having integral sides and an internal surface;
a first support structure disposed on the integral sides;
a second support structure disposed on the base portion;
a first substrate having first and second opposing surfaces, said first substrate disposed on the first support structure and spaced apart from the internal surface by a predetermined distance;
an antenna disposed on the first surface of said first substrate, the antenna having an aperture arranged to radiate through a portion of the base portion of said housing;
an RF transmit circuit disposed on the second surface of said first substrate and coupled to said antenna;
an RF receiver circuit disposed on the second surface of said first substrate, said RF receiver circuit coupled to said antenna;
a second substrate disposed on the second support structure in the base portion of said housing said second substrate having first and second opposing: surfaces with the first surface of said second substrate spaced apart from the second surface of said first substrate by a predetermined distance; and
one or more IF circuit components disposed on a first one of the first and second surfaces of said second substrate with at least one of said one or more IF circuit components coupled to at least one of said RF transmit circuit and said RF receiver circuit.

8. The sensor of claim 7 wherein the first support structure comprises a shoulder region disposed on the integral sides of the base portion for supporting said first substrate.

9. The sensor of claim 7 wherein the second support structure comprises a plurality of posts projecting from a bottom portion of the base portion.

10. The sensor of claim 7 further comprising a flex circuit for coupling the transmit and receiver circuits to the IF circuit components disposed on said second substrate.

11. The sensor of claim 7 further comprising a cover disposed on said housing.

12. The sensor of claim 11 wherein the cover is provided having a thickness selected to allow attachment to the base portion via a vibrational technique.

13. The sensor of claim 7 further comprising a radome disposed about the antenna aperture to tune the antenna.

14. The sensor of claim 7 wherein said antenna is comprised of a plurality of antenna elements, each of said plurality of antenna elements provided from resonant structures formed by conductive vias embedded in said plurality of tape layers.

15. The sensor of claim 14 wherein:
said RF transmit circuit is provided as a monolithic microwave integrated circuit;
said RF receiver circuit is provided as a monolithic microwave integrated circuit; and
said IF circuit comprises at least one discrete circuit component.

16. The sensor of claim 15 further comprising an electronics portion disposed on said second substrate and coupled to at least one of said one or more IF circuit components, the electronics portion comprising:
a digital signal processor (DSP);
a digital to analog converter (DAC);
a power supply;
a local area network transceiver and controller;
an analog to digital converter (A/D); and
a voltage controlled oscillator (VCO).

17. The sensor of claim 16 wherein the housing further comprises an EMI shield disposed over said first and second substrates for reducing the amount of EMI radiated from the sensor.

18. The sensor of claim 14 further comprising one or more of the plurality of tape layers.

19. The sensor of claim 7 wherein at least one of said RF transmitter circuit and said RF receiver circuit are provided as monolithic microwave integrated circuits (MMICs).

20. The sensor of claim 7 further comprising:
an audio output circuit having a first port at which is provided an audio detection alert;
an audio alert on/off switch coupled to said audio output circuit;
a display connector for attaching a radar display cable;
a battery port adapted to couple at least one battery; and
a connector for attaching a vehicle power and logic signal cable.

21. A radar sensor comprising:
a housing having an internal surface and a first support structure and a second support structure disposed thereon;
a first substrate comprising a plurality of low temperature co-fired ceramic (LTCC) layers, said first substrate disposed on the first support structure and spaced apart from the internal surface by a predetermined distance,
an antenna provided from the LTCC layers;
an RF transmitter circuit provided in the LTCC layers;
an RF receiver circuit provided in the LTCC layers;
a second substrate disposed on the second support structure and spaced above said first substrate by a predetermined distance; and
an IF circuit disposed on the second substrate.

22. The sensor of claim 21 further comprising a plurality of conductive vias provided in the LTCC layers, said conductive vias for interconnecting said antenna to said RF receiver and RF transmitter circuits.

* * * * *

UNITED STATES PATENT AND TRADEMARK OFFICE
CERTIFICATE OF CORRECTION

PATENT NO. : 6,501,415 B1
DATED : December 31, 2002
INVENTOR(S) : Luis M. Viana et al.

It is certified that error appears in the above-identified patent and that said Letters Patent is hereby corrected as shown below:

Column 2,
Line 66, reads "and RF antenna" and should read -- an RF antenna, --.

Column 3,
Line 5, reads "of shown" and should read -- of the type shown --.
Line 27, reads "or other vehicle portion" and should read -- or other vehicle portions --.
Line 33, reads "The radar systems 10" and should read -- The radar system 10 --.
Line 44, reads "The radar systems 10 are each" and should read -- The radar system 10 can be --.
Line 45, reads "section 12" and should read -- section 12, which is --.
Line 45, reads "which allows" and should read -- that allows --.

Column 5,
Line 23, reads "is disposed is the" and should read -- is disposed in the --.

Column 10,
Line 9, reads "through an additional" and should read -- through additional --.

Column 11,
Line 34, reads "and audio alert" and should read -- an audio alert --.
Line 50, reads "of an" and should read -- of a --.

Column 12,
Line 46, reads "one said one or" and should read -- one of said one or --.

Column 13,
Line 23, reads "opposing: surfaces" and should read -- opposing surfaces --.

Signed and Sealed this

Thirteenth Day of May, 2003

JAMES E. ROGAN
*Director of the United States Patent and Trademark Office*